July 28, 1953 J. H. HAMPTON 2,647,020
APPARATUS FOR CONVEYING DUST, FLY ASH, AND THE LIKE
Filed Jan. 21, 1949 3 Sheets-Sheet 1

Inventor
JOHN H. HAMPTON
By
Lee Edelson
Attorney

July 28, 1953  J. H. HAMPTON  2,647,020
APPARATUS FOR CONVEYING DUST, FLY ASH, AND THE LIKE
Filed Jan. 21, 1949  3 Sheets-Sheet 3

Inventor
JOHN H. HAMPTON
By
Attorney

Patented July 28, 1953

2,647,020

UNITED STATES PATENT OFFICE 2,647,020

APPARATUS FOR CONVEYING DUST, FLY ASH, AND THE LIKE

John H. Hampton, Oaklyn, N. J., assignor to Beaumont Birch Company, Philadelphia, Pa., a corporation of Pennsylvania Application January 21, 1949, Serial No. 72,010

8 Claims. (Cl. 302—40)

The present invention relates to vacuum ash handling systems and more particularly to improvements in cut-off gates for hoppers or the like and to improvements in air inlet apparatus used in vacuum ash handling systems.

It is an object of the present invention to provide, for use in vacuum ash handling systems, a sliding cut-off hopper gate which, in closed position, will establish its own vacuum seal in the system.

It is also an object of the present invention to provide, for use in vacuum handling systems, a sliding cut-off hopper gate and an air inlet apparatus which are adapted to be conjointly operated under remote control.

It is a further object of the present invention to provide means for conjointly operating a sliding cut-off hopper gate and an air inlet apparatus which includes a driven pinion in mesh with a rack on the gate to move the same and a roller cam on said gate adapted to operate said inlet apparatus as said gate is moved.

With the above objects in view, the invention further resides in the combination and arrangement of parts in the details of construction herein described and claimed; it being understood that the specific embodiments of the invention described herein are illustrative and that modifications thereof falling within the scope of the appended claims will be apparent to persons skilled in the art.

In the accompanying drawings:

Figure 5 is a view of the right hand portion of Figure 2 showing the position of the parts when the gate and the air inlet are open; and Figure 6 is a perspective view of the dissembled elements of the sliding cut-off gate.

Figure 1:
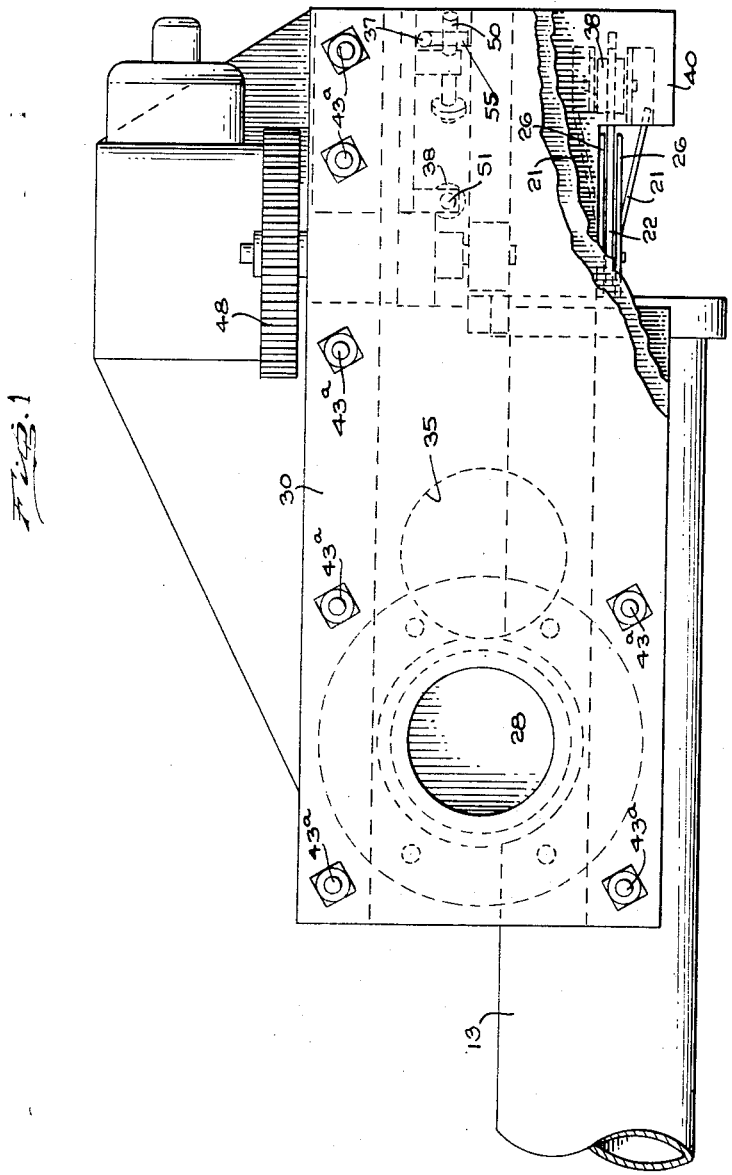
Figure 1 is a plan view of the improvements of the present invention operatively associated with a vacuum intake pipe of an ash handling system.
Figure 2:
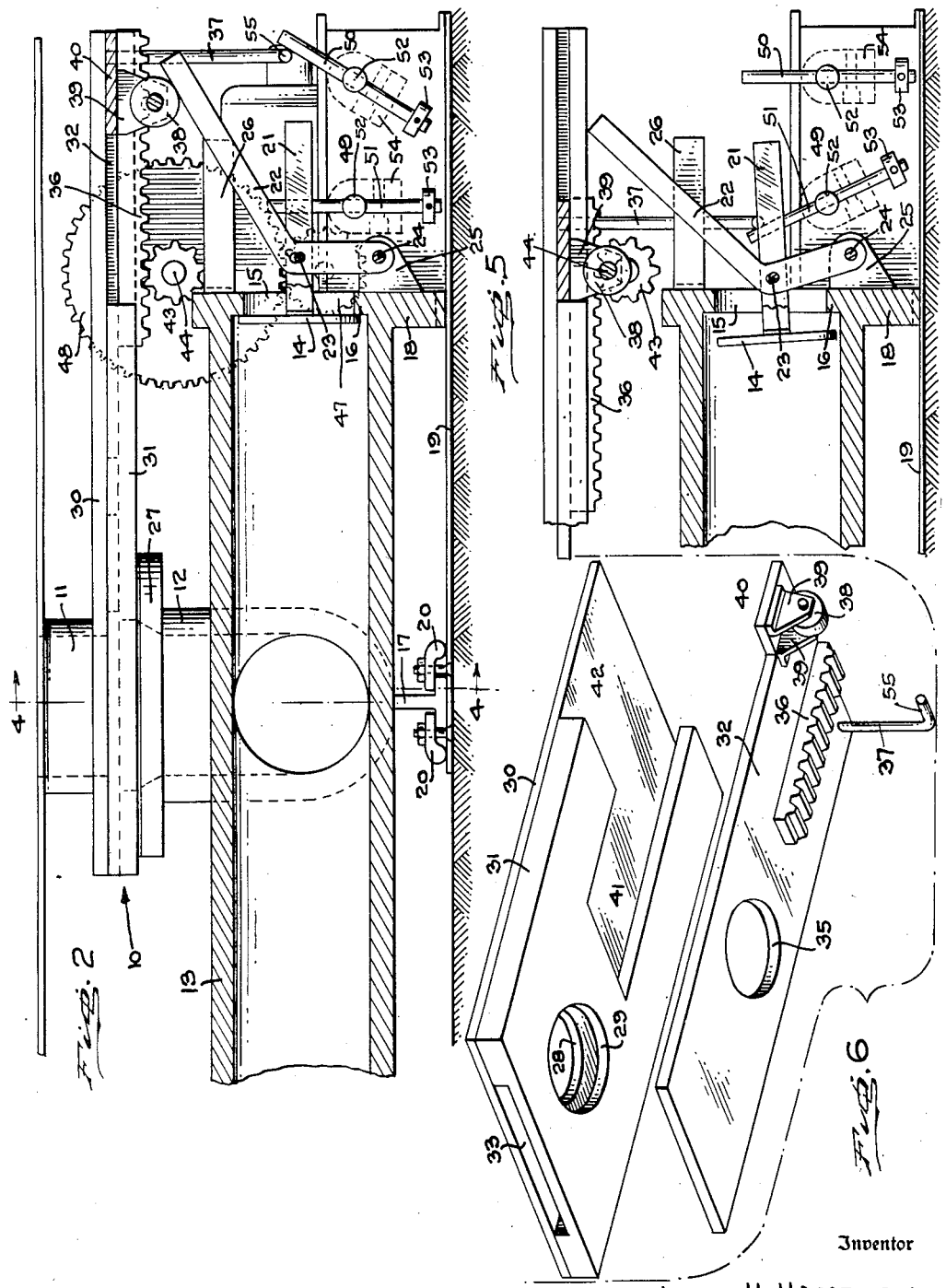
Figure 2 is a side view of the apparatus of Figure 1 showing the sliding cut-off gate, the air inlet device and their operating means, certain of the parts being in section, this view also showing the discharge end of a material collecting hopper or the like, certain parts thereof being shown in longitudinal section.
Figure 3:
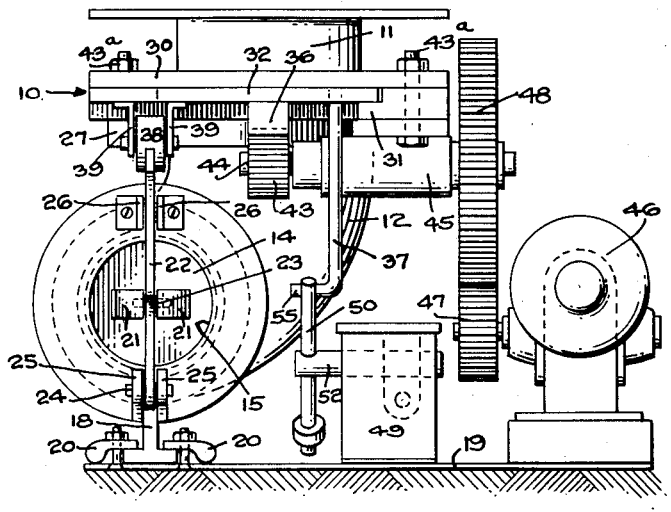
Figure 3 is an end elevational view of the apparatus of Figure 2.
Figure 4:
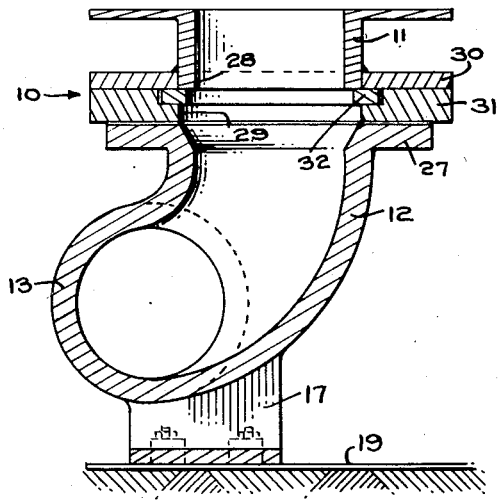
Figure 4 is a vertical cross-sectional view through the hopper and a branch of the vacuum intake pipe as taken on line 4—4 of Figure 2.

Referring now to the drawings and more particularly to Figure 2 thereof, it will be observed that the apparatus of the present invention includes a sliding cut-off gate 10 operatively related to and interposed between the discharge end of an ash collecting hopper 11 or the like and a vertically extending, laterally off-set branch 12 of the discharge conduit 13 of a vacuum ash handling system, the conduit 13 being adapted to remove by suction the contents of hopper 11 discharged into branch 12, when the cut-off gate 10 is open. Provided in the flanged rear end of the conduit 13 is a flat circular closure plate 14 for opening and closing to atmosphere the air inlet 15 formed in the rear end of the conduit 13, the plate 14 being disposed interiorly of the conduit for seating engagement against the annular flange 16 which marginally defines the air inlet opening 15. The ash cut-off gate 10 and the air inlet closure plate 14 are adapted to be conjointly operated so that both are either in opened or in closed positions at the same time. To positionally secure the conduit 13 in place on a floor plate 19, depending flanged supports 17 and 18 respectively formed on the underside of branch 12 and on the underside of conduit 13 at its rear end are secured to said floor plate 19 by any suitable means, such as dog clamps 20—20.

The closure plate 14 is supported for movement toward and away from the air inlet opening 15 by a pair of laterally spread arms 21—21 which extend from plate 14 rearwardly through the opening 15 on either side of a bell-crank operating lever 22 to which they are commonly pivotally secured as at 23. One arm of the lever 22 is pivotally supported as at 24 between brackets 25—25 extending from the rear of the conduit 13, while the other arm of said lever is guided for movement between a pair of rearwardly extending arms 26—26 suitably secured to the rear end of the conduit 13 immediately above the air inlet opening 15.

Referring now to Figure 2, it will be observed that a flange 27 at the upper end of the laterally off-set branch conduit 12 secured to the underside of gate 10 supports the same with its circular openings 28—29 in registry with the openings in branch 12 and in hopper 11. As best seen in Figure 6, the gate 10 is constructed of spaced upper and lower guide plates 30 and 31 between which a rectangular shaped closure member 32 is adapted to slide lengthwise within a longitudinally extending channel 33 formed in the upper surface of the lower plate 31. The slidable closure member 32, provided with a circular opening 35 spaced from one end thereof, is adapted to be moved within the channel 33 so as to present its opening 35 into or out of registry with the openings 28 and 29 of the relatively fixed guide plates 30 and 31. To effect this sliding movement of the member 32 relatively to its guide plates, the member 32 is centrally provided on its underside with a toothed rack 36 extending longitudinally from the rear end of the member 32 to a point short of its opening 35. The sliding gate member 32 is also provided with a depending switch actuating member 37 and with a lever actuating cam roller 38, the switch actuating member 37 and the cam roller 38 being spaced to either side of the rack 36, the roller 38 being suitably rotatably supported between brackets 39—39 extending downwardly from a side extension 40 at the rear end of the member 32. It will be noted that lower guide plate 31 is cut away to provide openings 41 and 42 in which rack 36 and roller 38 are adapted to enter without interference when said sliding member 32 is moved into its fully opened position. Bolts 43ª spaced along both sides of the guide plates 30 and 31 secure them together in superimposed relation.

To shift the sliding member 32 longitudinally within its guide channel 33 formed between the fixed plates 30 and 31, a pinion 43 in constant engagement with the rack 36 is keyed to one end of a shaft 44 suitably supported for rotation in a bearing 45 suitably secured to the underside of the plate 30. An electric motor 46, suitably secured to floor plate 19, drives the shaft 44 through reduction gears 47 and 48, the gear 47 being fixed to the motor shaft and the gear 48 being fixed to the outer end of the shaft 44. The motor 46 is adapted to be operated by remote control switches (not shown) for rotation in either direction to accordingly move sliding member 32 to opened or closed position.

To stop the motor 46 and so correspondingly arrest the movement of member 32 when it has reached its furthermost position of travel in either direction, a switch box 49 is provided. The switch box 49, also suitably secured to floor plate 19, is provided with a pair of oscillatably mounted switch actuating arms 50—51 suitably secured at approximately their midpoints to the projecting ends of shafts 52—52 mounted for rocking movement in the sides of said switch box 49, the said switch arms 50—51 being normally maintained in vertical position by counterweights 53—53 secured to their lower ends. Mercury switches 54—54, provided on shafts 52—52 inside switch box 49, are adapted to be alternately actuated when the bent portion 55 of depending switch actuating member 37 on moving closure plate 32 engages and moves the upper ends of the switch arms 50—51 (see Figures 2 and 5) to alternately rock the shafts 52—52, the actuation of the switches 54—54 serving to instantly stop motor 46 when the sliding gate member 32 reaches the limit of its permissible travel in one or the other of its opposite directions of movement.

It will be noted that when the sliding gate member 32 is rearwardly moved into its closed position (in which position the opening 35 is out of registry with the openings 28—29 of the fixed guide plates 30—31), the roller 38 carried by the member 32 is adapted to engage the raised end 56 of the bell-crank lever 22 to thereby shift the same about its pivot point 24 to close the air inlet closure plate 14 (see Figure 2). Conversely, as shown in Figure 5, as the closure plate 32 moves into its forward position to present its opening 35 in registry with the ash discharge openings 28—29 of the fixed guide plates 30—31, the roller 38 is disengaged from the lever 22 to free the latter and thus permit the air inlet closure plate 14 to open under atmospheric pressure. Under such operating condition of the apparatus, the conduit 13 may be subject to a vacuum pull sufficient to draw the ash accumulated in the hopper 11 into the conduit 13 for conveyance to a suitable point of discharge.

The portion of the vacuum ash handling system disclosed may be located at places remote to the operator and may be operated by suitable control of electric motor 46. The starting of this motor in the proper direction may be by manual or automatic actuation of its starting switches at suitable intervals, the motor thereafter stopping itself by actuation of the mercury switches 54—54 in the switch box 49 automatically when the member 32 reaches the limit of its permissible movement in either direction.

It will be understood, of course, that the present invention is susceptible of various changes and modifications which may be made from time to time without departing from the general principles or real spirit thereof, and it is accordingly intended to claim the same broadly, as well as specifically, as indicated by the appended claims.

What is claimed as new and useful is:

1. In a vacuum material handling system having a material collecting hopper operatively related to a vacuum material collecting conduit having an air inlet, a gate for said hopper interposed between the same and said conduit at a point spaced from said air inlet and a closure member for said air inlet, said gate comprising fixed spaced parallel upper and lower guide plates and a movable closure plate adapted to slide between said guide plates, said fixed plates having interiorly disposed openings axially aligned with each other and with the discharge end of said hopper, said closure plate also having an interiorly disposed opening adapted to either register with said fixed plate openings in the opened position of said gate or to be covered by said upper plate in the closed position of said gate as said closure plate slides between said fixed plates, a rack on said closure plate and a driven pinion in engagement with said rack for moving said closure plate to gate opening and gate closing positions, said air inlet closure member being mounted on an arm for movement toward and away from said air inlet, said closure plate in the closed position of said gate being adapted to engage said arm to move said closure member toward said air inlet to close the same.

2. A vacuum material handling apparatus as defined in claim 1 characterized by the provision of a reversible electric motor operative to drive said rack-engaging pinion and by means operative automatically to interrupt operation of said motor upon movement of said closure plate into gate opening or gate closing position.

3. A vacuum material handling apparatus as defined in claim 1 characterized by the provision of a reversible motor operative to drive said rack-engaging pin alternately in opposite directions in combination with a switch gear for stopping said motor, an actuating member for the switch gear operative upon the latter to stop said motor at the furthermost position of travel of said closure plate in each of its directions of movement.

4. In an apparatus of the character described, in combination, an ash receiver, a conduit operatively associated with the receiver for removal of ash therefrom by suction, the rear end of said conduit being open to atmosphere, a closure member operative to close said rear end of the conduit to atmosphere, said closure member being pivotally supported for movement into and out of closing position, a gate interposed between the receiver and the conduit for opening and closing the ash-delivery passage therebetween, and means operative automatically to seal the rear end of said conduit from atmosphere when said gate is in fully closed position.

5. In an apparatus of the character described, in combination, an ash receiver, a conduit operatively associated with the receiver for removal of ash therefrom by suction, the rear end of said conduit being open to atmosphere, a closure member operative to close said rear end of the conduit to atmosphere, said closure member being pivotally supported for movement into and out of closing position, a gate interposed between the receiver and the conduit for opening and closing the ash-delivery passage therebetween, and means operative automatically to seal the rear end of said conduit to atmosphere when said gate is in fully closed position, said last-mentioned means being rendered inoperative upon movement of said gate into its open position.

6. In an apparatus of the character described, in combination, an ash receiver, a conduit operatively associated with the receiver for removal of ash therefrom by suction, the rear end of said conduit being open to atmosphere, a closure member operative to close said rear end of the conduit to atmosphere, said closure member being pivotally supported for movement into and out of closing position, a gate interposed between the receiver and the conduit and movable in opposite directions for opening and closing the ash-delivery passage therebetween, and means operative automatically to selectively close or open said closure member accordingly as said gate is moved into its closed or opened position.

7. In an apparatus as defined in claim 4 wherein said closure member is pivotally supported by a bell-crank lever having an upwardly extending arm and wherein said gate is rectilinearly shiftable and is provided with an element adapted to engage said arm to move said closure member into closed position simultaneously as said gate is shifted into its fully closed position.

8. In an apparatus as defined in claim 4 wherein said closure member is pivotally supported by a bell-crank lever having an upwardly extending arm and wherein said gate is rectilinearly shiftable and is provided with an element adapted to engage said arm to move said closure member into closed position simultaneously as said gate is shifted into its fully closed position, said closure member being balanced to open to atmosphere automatically as said gate is rectilinearly shifted in a direction to open the passage between the receiver and the ash-removing conduit.

JOHN H. HAMPTON.

References Cited in the file of this patent

UNITED STATES PATENTS

| Number | Name | Date |
|---|---|---|
| 935,778 | Cole | Oct. 5, 1909 |
| 1,135,286 | Jackson | Apr. 13, 1915 |
| 1,209,597 | Lassiter | Dec. 19, 1916 |
| 1,829,182 | Beaumont | Oct. 27, 1931 |